US009330274B2

(12) United States Patent
Schepis et al.

(10) Patent No.: US 9,330,274 B2
(45) Date of Patent: May 3, 2016

(54) METHODS AND SYSTEMS FOR APPLYING PARENTAL-CONTROL POLICIES TO MEDIA FILES

(75) Inventors: Adam Schepis, Milford, MA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 973 days.

(21) Appl. No.: 12/404,031

(22) Filed: Mar. 13, 2009

(65) Prior Publication Data

US 2010/0235923 A1  Sep. 16, 2010

(51) Int. Cl.
G06F 21/62 (2013.01)
G06F 21/12 (2013.01)
H04W 12/08 (2009.01)
G06F 21/60 (2013.01)

(52) U.S. Cl.
CPC .......... *G06F 21/6218* (2013.01); *G06F 21/121* (2013.01); *G06F 21/60* (2013.01); *G06F 2221/2149* (2013.01); *H04W 12/08* (2013.01)

(58) Field of Classification Search
CPC ........... H04N 21/47202; H04W 12/08; H04W 12/06; G06F 21/6218; G06F 21/60; G06F 21/12; G06F 21/121
USPC ...................................................... 726/27–30
See application file for complete search history.

(56) References Cited

U.S. PATENT DOCUMENTS

| | | | |
|---|---|---|---|
| 4,757,533 A | 7/1988 | Allen et al. | |
| 7,472,424 B2 | 12/2008 | Evans et al. | |
| 2002/0069370 A1 | 6/2002 | Mack | |
| 2003/0005135 A1* | 1/2003 | Inoue | G06F 21/10 709/229 |
| 2004/0103301 A1 | 5/2004 | Inokuchi et al. | |
| 2004/0208319 A1* | 10/2004 | Hursey | H04N 7/17318 380/202 |
| 2005/0081043 A1* | 4/2005 | Evans | H04N 7/162 713/182 |
| 2005/0240959 A1* | 10/2005 | Kuhn | H04N 7/163 725/25 |
| 2007/0016952 A1* | 1/2007 | Stevens | G06F 21/51 726/24 |
| 2007/0055754 A1 | 3/2007 | Robbin et al. | |

FOREIGN PATENT DOCUMENTS

| | | |
|---|---|---|
| EP | 1489516 | 12/2004 |
| EP | 1523186 | 4/2005 |
| GB | 2398408 | 8/2004 |
| JP | 2003006998 | 1/2003 |
| JP | 2005116059 | 4/2005 |
| JP | 2006172161 | 6/2006 |

(Continued)

OTHER PUBLICATIONS

"Snitch"; (accessed May 15, 2009); Hyperdyne Software; http://www.hyperdynesoftware.com/.

(Continued)

*Primary Examiner* — Ali Abyaneh
*Assistant Examiner* — Carlos M De Jesus Lassala
(74) *Attorney, Agent, or Firm* — ALG Intellectual Property, LLC

(57) ABSTRACT

A computer-implemented method may intercept a file-system call associated with a media file. The computer-implemented method may determine an attribute of the media file. The computer-implemented method may also identify a parental-control policy associated with the attribute of the media file. The computer-implemented method may further apply the parental-control policy to the media file. Various other methods, systems, and computer-readable media are also disclosed.

20 Claims, 6 Drawing Sheets

(56) References Cited

FOREIGN PATENT DOCUMENTS

| WO | WO2005/109883 | 11/2005 |
|---|---|---|
| WO | WO2007/072209 | 6/2007 |

OTHER PUBLICATIONS

Extended European Search Report Received in related International Application No. 10156135.5; Jul. 20, 2010.

"Microsoft", http://www.microsoft.com/en-us/, as accessed Feb. 4, 2009, (Dec. 15, 2007).

"Net Nanny", https://www.netnanny.com/, as accessed Feb. 4, 2009, (Oct. 17, 1996).

"CyberPatrol", https://www.cyberpatrol.com/, as accessed Feb. 4, 2009, (Oct. 18, 1996).

"Safe Eyes", http://www.internetsafety.com/safe-eyes-parental-control-software.php, as accessed Feb. 4, 2009, (Jul. 3, 2008).

"McAfee", http://www.mcafee.com/us/, as accessed Feb. 4, 2009, (Feb. 29, 2000).

"Kaspersky", http://usa.kaspersky.com/?domain=kaspersky.com, as accessed Feb. 4, 2009, (On or before Feb. 4, 2009).

\* cited by examiner

METHODS AND SYSTEMS FOR APPLYING PARENTAL-CONTROL POLICIES TO MEDIA FILES

BACKGROUND

Parental-control applications may allow a parent to monitor and control the content a child may access over the Internet. However, traditional parental-control applications may focus on web content (e.g., monitoring and blocking websites) and chat activity (monitoring conversations and blocking buddies). Traditional parental-control applications may not prevent access to inappropriate digital content in music files, video files, e-books, and other media files.

Some traditional media players may provide limited parental-control functionality. However, media players that provide parental controls may only prevent a child from accessing inappropriate content with the media player. Parents do not have tools for preventing their children from accessing media content using other media players and access mechanisms.

SUMMARY

The instant disclosure is directed to methods and systems for applying parental-control policies to media files. Embodiments of the instant disclosure may enable a parent to monitor and/or control a child's access to audio files, video files, and/or other media files. For example, a file-system-monitor module may intercept a file-system call associated with a media file. A file-system call may include a call to read the media file and/or write the media file. After intercepting the file-system call, the file-system-monitor module may determine an attribute of the media file. Then, a policy-enforcement module may identify a parental-control policy associated with the attribute of the media file and may apply the parental-control policy to the media file.

In some embodiments, the attribute of the media file may include a name of the media file, a name of the content in the media file (e.g., a name of a song or a movie), a genre of the content in the media file, a signature included with the media file, and/or any other characteristic of the media file. The file-system-monitor module may determine the attribute of the media file by querying a database and/or by accessing metadata included with the media file.

According to certain embodiments, the policy-enforcement module may use the attribute of the media file to identify a parental-control policy directly associated with the media file. For example, if the media file is a song, the attribute may be an artist of the song. The policy-enforcement module may identify a parental-control policy associated with the media file by determining that access to songs by the identified artist should be blocked.

In other embodiments, the policy-enforcement module may identify a parental-control policy associated with an attribute of the media file by using the attribute to determine a category rating of the media file. The policy-enforcement module may apply the parental-control policy to the media file by determining whether the category rating violates the parental-control policy. The category rating may include a sexual-content rating for a file, a strong-language rating for a file, and/or a violence rating for a file.

Some embodiments may include tracking the child's attempts to access media files. Certain embodiments may include applying the parental-control policy to media files by deleting media files and/or preventing access to media files.

The instant disclosure also presents various other embodiments, alternatives, and examples for applying parental-control policies to media files.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
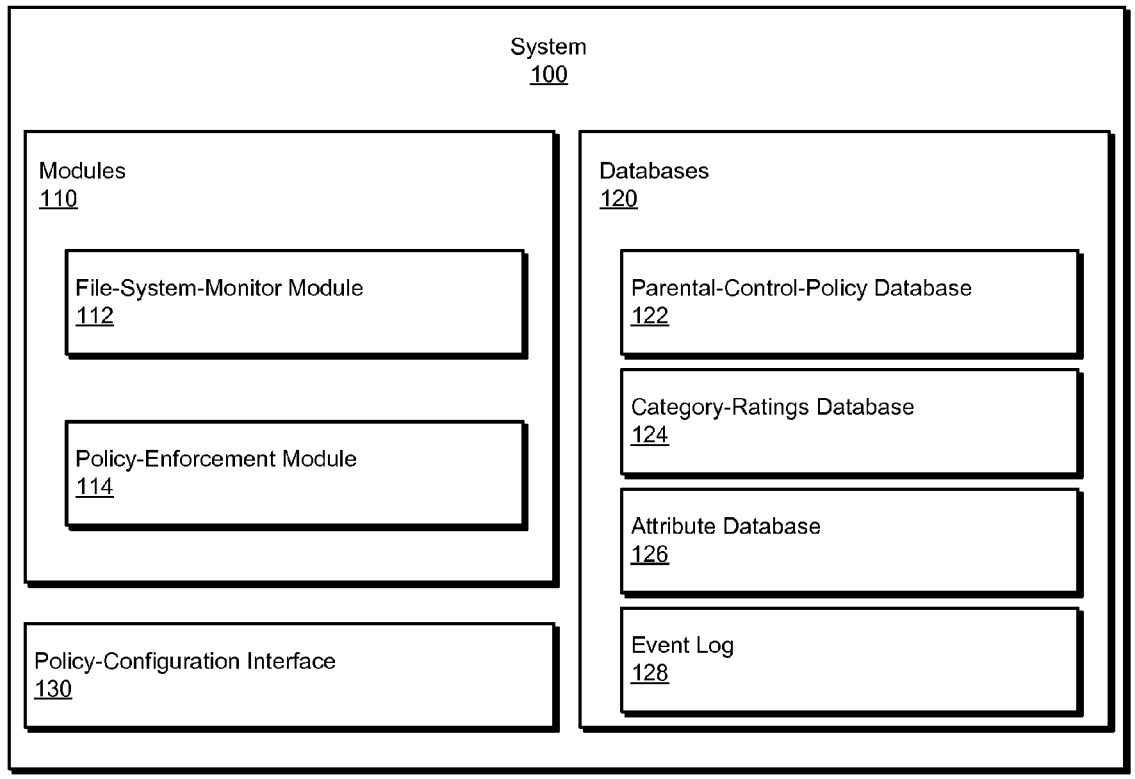
FIG. 1 is a block diagram of an exemplary system for applying parental-control policies to media files according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the instant disclosure provide methods and systems for applying parental-control policies to media files. For example, a file-system-monitor module may intercept attempts to read and/or write media files. The file-system-monitor module may determine an attribute of the media file, and a policy-enforcement module may identify a parental-control policy associated with the attribute of the media file. The policy-enforcement module may also apply the parental-control policy to the media file.

Figure 2:
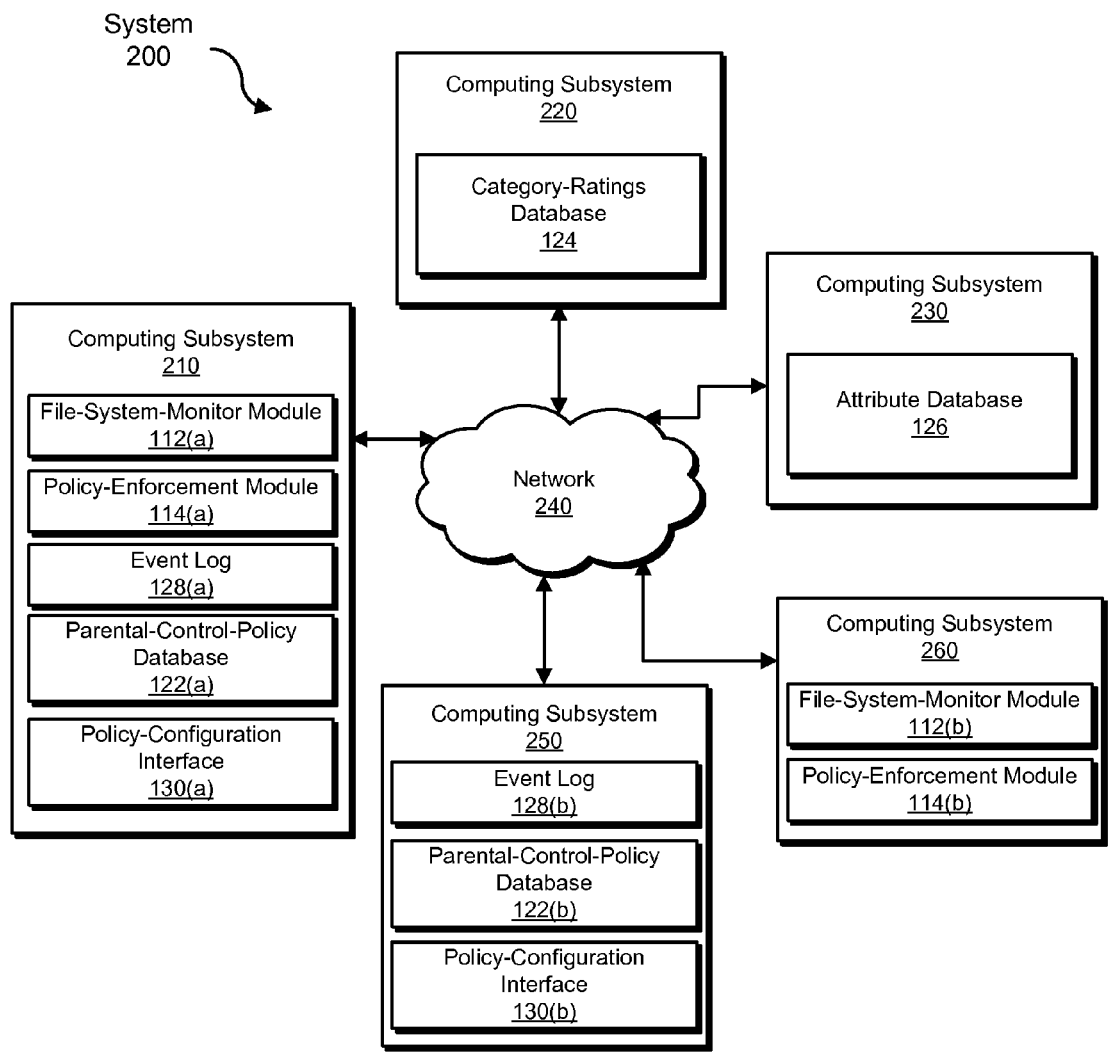
FIG. 2 is a block diagram of another exemplary system for applying parental-control policies to media files according to certain embodiments.
Figure 3:
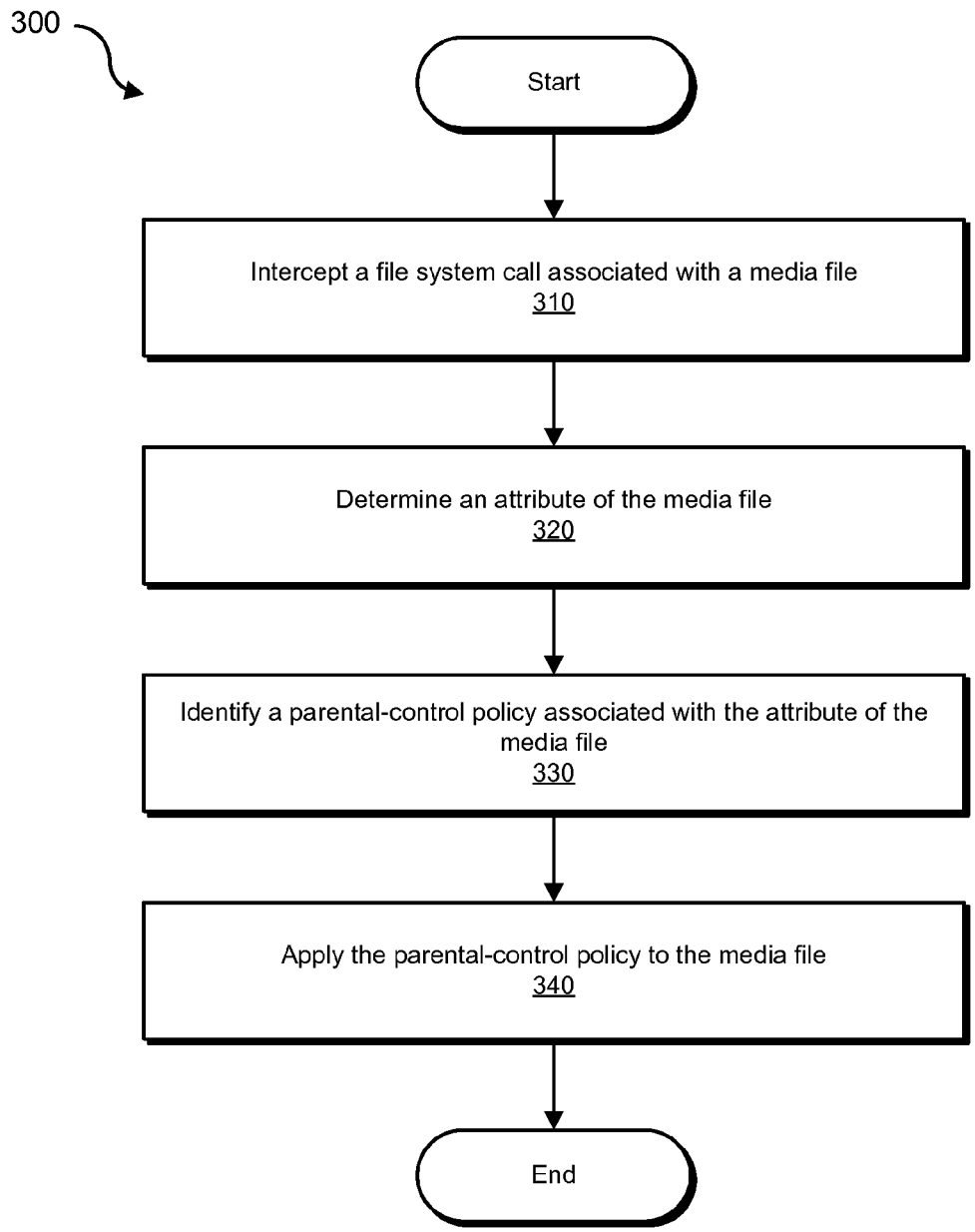
FIG. 3 is a flow diagram of an exemplary method for applying parental-control policies to media files according to certain embodiments.
Figure 4:
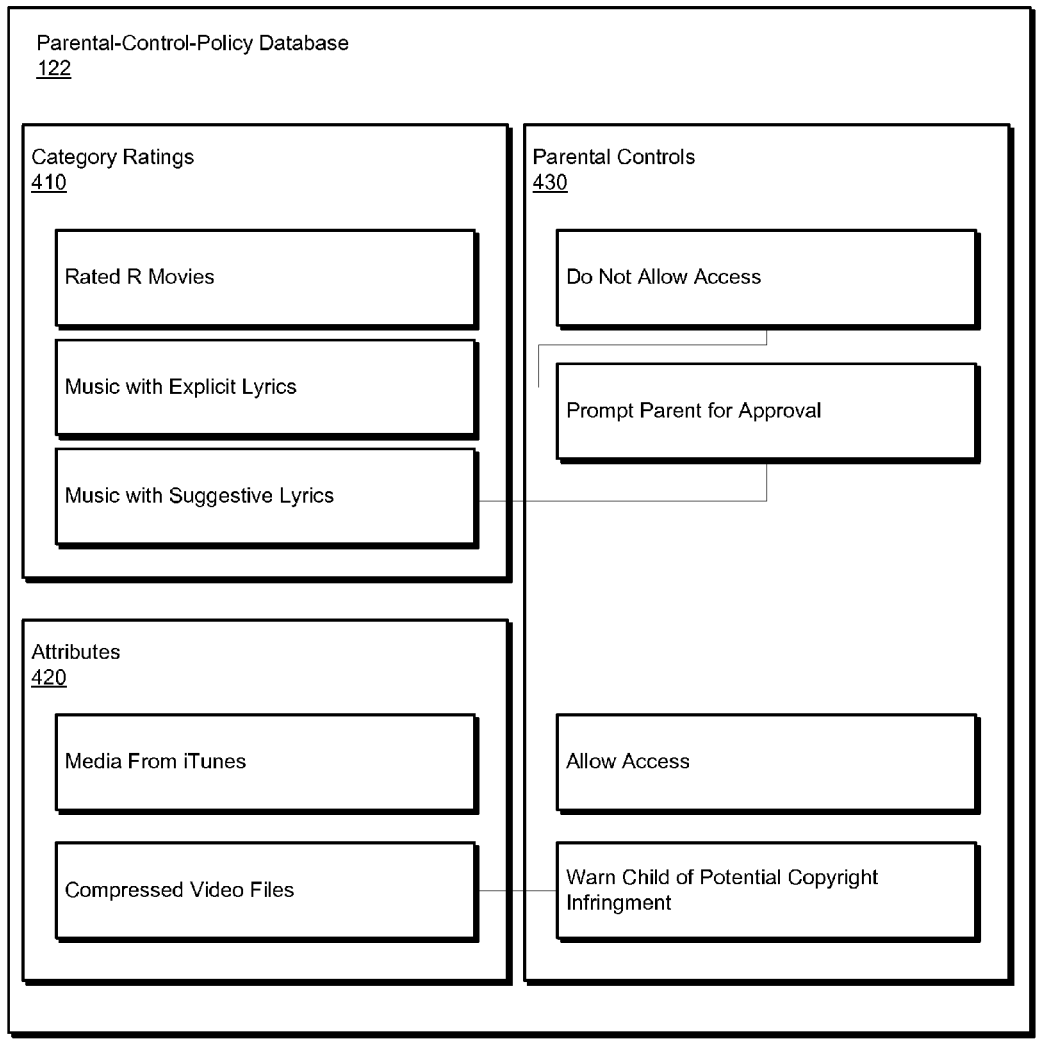
FIG. 4 is a block diagram of an exemplary parental-control-policy database according to certain embodiments.
Figure 5:
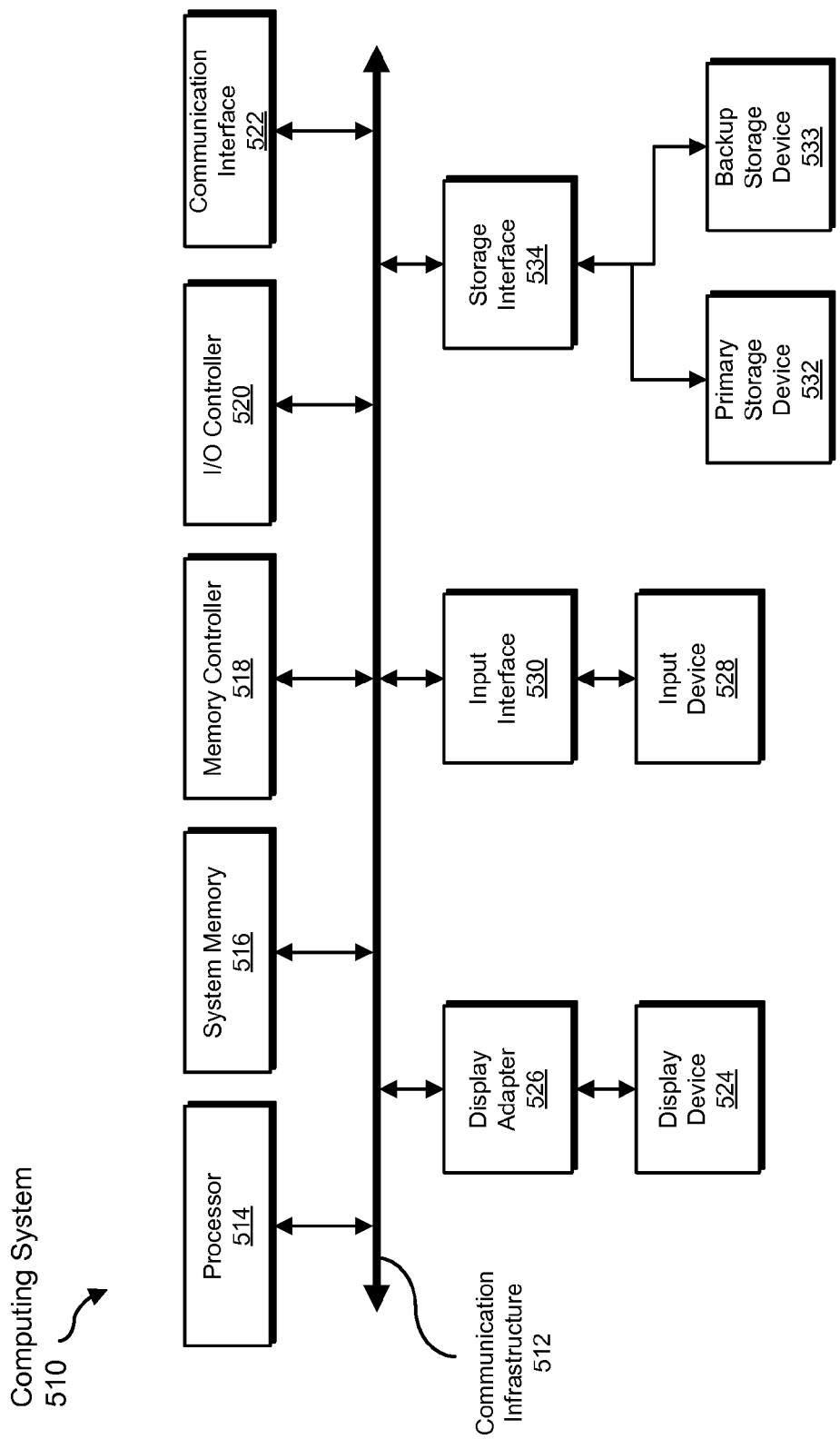
FIG. 5 is a block diagram of an exemplary computing system capable of implementing one or more of the embodiments described and/or illustrated herein.
Figure 6:
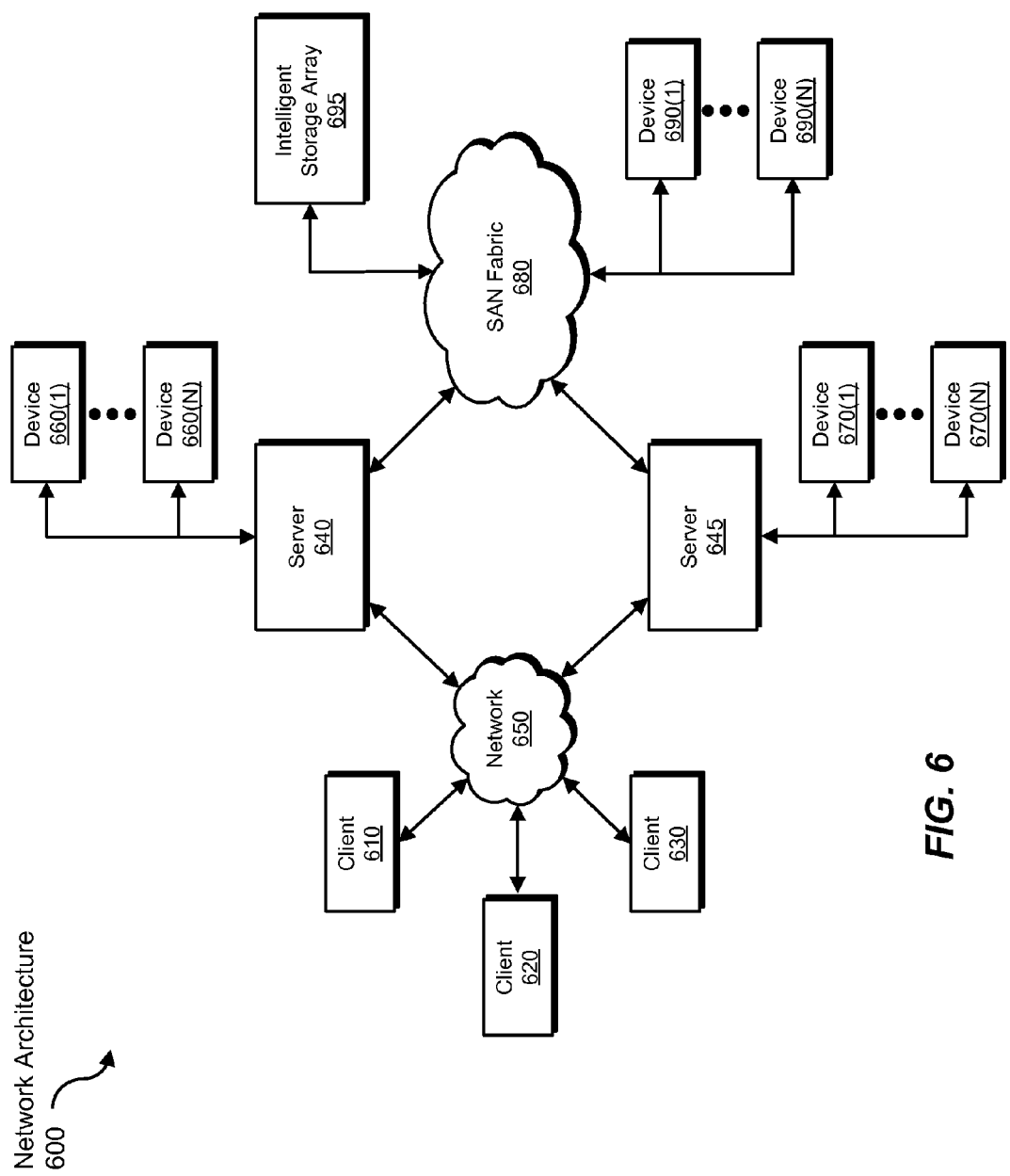
FIG. 6 is a block diagram of an exemplary computing network capable of implementing one or more of the embodiments described and/or illustrated herein.

FIGS. 1 and 2 show exemplary systems for applying parental-control policies to media files, and FIG. 3 shows an exemplary method for accomplishing the same. FIG. 4 illustrates an exemplary parental-control-policy database, and FIGS. 5 and 6 illustrate an exemplary network and computing system for implementing embodiments of the instant disclosure.

FIG. 1 illustrates an exemplary parental-control computing system 100 for applying parental-control policies to media files. System 100 may include modules 110, databases 120, and a policy-configuration interface 130. Modules 110 may include a file-system-monitor module 112 and a policy-enforcement module 114. File-system-monitor module 112 may be programmed to identify a media file, determine an attribute of the media file, and/or query a category-ratings database to identify a category rating associated with the media file. Policy-enforcement module 114 may be programmed to query a parental-control-policy database to identify a parental-control policy associated with the category rating of the media file. Policy-enforcement module 114 may also be programmed to apply the parental-control policy to the media file.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 510 in FIG. 5 and/or portions of exemplary network architecture 600 in FIG. 6. One or more of modules 110 in FIG. 1 may also represent all or portions of one or more special-purpose computers configured to perform one or more of the tasks associated with steps disclosed herein.

As previously noted, system 100 may include databases 120. Databases 120 may include a parental-control-policy database 122, a category-ratings database 124, an attribute database 126, and an event log 128. Parental-control-policy database 122 may store one or more parental-control policies and may associate one or more parental-control policies with one or more category ratings. Category-ratings database 124 may store one or more category ratings and associate one or more category ratings with one or more media files and/or one or more media-file attributes. Attribute database 126 may store one or more attributes and may associate one or more attributes with one or more media files.

One or more of databases 120 in FIG. 1 may represent a portion of one or more computing devices. For example, one or more of databases 120 may represent a portion of one or more of the subsystems illustrated in FIG. 2, computing system 510 in FIG. 5, and/or portions of exemplary network architecture 600 in FIG. 6. Alternatively, one or more of databases 120 in FIG. 1 may represent one or more physically separate devices capable of being accessed by a computing device, such as one or more of the subsystems illustrated in FIG. 2, computing system 510 in FIG. 5, and/or portions of exemplary network architecture 600 in FIG. 6.

System 100 may also include policy-configuration interface 130. Policy-configuration interface 130 may provide a graphical user interface and may be programmed to enable a parent to create parental-control policies, modify parental-control policies, and/or associate parental-control policies with media files, category ratings, and/or attributes of media files. In some embodiments, policy-configuration interface 130 may display a report of a child's attempts to access media files to a parent. In certain embodiments, a parent may be notified when a child attempts to access a media file. The parent may be notified by receiving an email, an instant message, an alert, and/or through any other suitable notification mechanism.

FIG. 2 illustrates a system 200 that provides an exemplary configuration of components of system 100. System 200 may include a computing subsystem 210, a computing subsystem 220, a computing subsystem 230, a computing subsystem 250, a computing subsystem 260, and a network 240. Computing subsystem 210 may include a file-system-monitor module 112(a), a policy-enforcement module 114(a), and an event log 128(a). Computing system 210 may also include parental-control-policy database 122(a) and policy-configuration interface 130(a). Computing subsystem 220 may include category-ratings database 124, and computing subsystem 230 may include attribute database 126. Computing subsystem 250 may include an event log 128(b), a parental-control-policy database 122(b), and a policy-configuration interface 130(b). Computing subsystem 260 may include a file-system-monitor module 112(b) and a policy-enforcement module 114(b).

As an example of how embodiments of the instant disclosure may be implemented in system 200, a parent may use policy-configuration interface 130(a) to establish parental-control policies for media files on computing subsystem 210. A child may use computing subsystem 210 to attempt to access a media file, and file-system-monitor module 112(a) may detect the attempt. File-system-monitor module 112(a) may query attribute database 126 for attributes of the media file, and policy-enforcement module 114(a) may use the attributes of the media file to query category-ratings database 124 for a rating of the media file. Policy-enforcement module 114(a) may query parental-control-policy database 112(a) to identify a parental-control policy associated with the category rating, and then policy-enforcement module 114(a) may enforce the parental-control policy for the media file.

In other embodiments, a parent may establish and/or maintain parental-control policies on a different computing device than the computing device used by a child. For example, a parent may use policy-configuration interface 130(b) on computing subsystem 250 to establish parental control policies, which may be stored in parental-control-policy database 122(b). A child may use computing subsystem 260 to attempt to access a media file. Policy-enforcement module 114(b) may communicate with parental-control-policy database 122(b) over network 240 to determine whether the child should be allowed to access the media file.

FIG. 3 shows an exemplary method for applying parental-control policies to media files. The steps shown in FIG. 3 may be performed by any suitable computer executable code and/or computing system. In some embodiments, the steps shown in FIG. 3 may be performed by one or more of file-system-monitor module 112 and/or policy-enforcement module 114. For example, at step 310 file-system-monitor module 112 may intercept a file-system call associated with a media file.

In some embodiments, file-system-monitor module 112 may intercept the file-system call by intercepting an attempt to write the media file to a storage device. In other embodiments, file-system-monitor module 112 may intercept the file-system call by intercepting an attempt to read the media file. A file-system call may include a request made to an operating system to access a file in the file system. For example, if a child attempts to access the file through a file-system manager, such as WINDOWS EXPLORER, the file-system call may be from the file-system manager. The file-system call may also be from any other application that may be used by a child to access a media file, such as a music player, a movie player, an e-book reader, or any other media-file player.

In some embodiments, file-system-monitor module 112 may include a file-system driver that intercepts file-system calls. The file-system driver may intercept file-system calls and may determine whether the calls are attempts to access media files. For example, the file-system driver may check file-system calls for attempts to access files with certain extensions (e.g., .MP3, .WAV, .MOV, or any other media file extension). The file-system driver may also use any other suitable process for determining whether a file-system call includes an attempt to access a media file. For example, the file-system driver may identify calls from particular programs, such as media players, as being calls to access media files.

As used herein, the phrase "media file" may refer to any type of file that contains media content. Examples of media files include audio files, video files, and e-book files. Examples of audio file formats may include .WAV files, .FLAC files, .MP3 files, .MP4 files, .WMA files, .RA files, and/or various other types of audio files. Examples of video file formats may include .MPEG files, .MPG files, .MOV files, .AVI files, .DIVX files, and/or various other video file types.

At step 320, file-system-monitor module 112 may determine an attribute of the media file. An attribute of a media file may include any characteristic of the media file. For example, an attribute of the media file may include a name of the media file. An attribute of the media file may also include a name of the content in the media file (e.g., the name of a song, movie, or book stored in the media file). An attribute of the media file may also include a genre of the content in the media file (e.g., the genre of a song, movie, or book stored in the media file). In some embodiments, an attribute of the media file may include an artist who wrote or performed a song, an author of a book, and/or one or more actors, directors, and/or producers of a movie. An attribute of a media file may also include a publisher of the media file, a fingerprint (e.g., a hash) of the file, and/or a signature included with the media file. For example, if the media file is digitally signed by a content provider, such as ITUNES, RHAPSODY, or any other content provider, the media file may include a Digital Rights Management (DRM) and/or any other digital signature indicative of a provider of the media file.

In some embodiments, file-system-monitor module 112 may access metadata of the media file and/or other data included with the media file to determine an attribute of the media file. Metadata may provide various types of attribute information about a file and content in the file. For example, an ID3 tag may be included with an MP3 file and may provide title, artist, album, track number, and/or other information about the file.

In addition to or instead of accessing file metadata, file-system-monitor module 112 may access a remote or local database, such as attribute database 126, to determine attributes of the media file. An example of an attribute database is a Compact Disc DataBase (CDDB), which may associate a fingerprint of a CD with track and author data for a compact disc. Attribute database 126 may also include any other public or private media attribute database. File-system-monitor module 112 may identify a title, fingerprint, signature, or other file identifier and may send the file identifier to attribute database 126. In response, attribute database 126 may return other attributes.

At step 330, policy-enforcement module 114 may identify a parental-control policy associated with the attribute of the media file. Policy-enforcement module 114 may identify the parental-control policy in any suitable manner. In some embodiments, parents may create parental-control policies for particular files and/or attributes of files. For example, a parent may restrict access to particular songs, artists, movies, and/or content providers. In such embodiments, policy-enforcement module 114 may send an attribute of the file to parental-control-policy database 122, and parental-control-policy database 122 may return a policy associated with the attribute.

In addition to or instead of creating parental-control policies for particular files or attributes, parents may create parental-control policies for category ratings of media files. For example, a parent may restrict access to media files with particular category ratings. In such embodiments, file-system-monitor module 112 may query category-ratings database 124 with an attribute of a file, such as a file name. Category-ratings database 124 may respond with a category rating of the file. Policy-enforcement module 114 may then query parental-control-policy database 122 with the category-rating for the file, and parental-control-policy database 122 may return a policy associated with the category rating. Parental-control-policy database 122 may apply the policy to the file.

A category rating of a file may include any classification of a file. For example, a category rating may indicate that a file contains sexual content, strong language, and/or violence. In some embodiments, category ratings may include movie classifications, such as G, PG, PG-13, or R. Category ratings may also indicate any other rating information, such as whether the media file contains politically-charged information. FIG. 4 provides examples of how parental-control policies may be associated with category-ratings and attributes.

The phrase "parental-control policies," as used herein, generally refers to policies and/or settings that control access to computing information and/or resources (e.g., the Internet and/or a computing system). Parental-control policies may include policies that restrict, limit, prohibit, or otherwise control activities of children. For example, parental-control policies may include policies that limit access to various types of objectionable content and/or content that may be inappropriate for children of a particular age. In some embodiments, a parental-control policy may set forth prohibited media files.

Parental-control policies may be established by parents, guardians, teachers, and/or others interested in protecting children from accessing inappropriate media files. Thus, the term "parent" is used herein to refer to any individual who establishes, maintains, or otherwise administers control policies that apply to media files accessed by a child.

At step 340, policy-enforcement module 114 may apply the parental-control policy to the media file. Policy-enforcement module 114 may enforce the parental-control policy in any suitable manner. For example, policy-enforcement module 114 may enforce the parental-control policy by preventing a child from accessing a media file. In other embodiments, policy-enforcement module 114 may enforce the parental-control policy by deleting a file that violates the policy after the file is written to a storage device.

FIG. 4 illustrates examples of how parental-control policies may be associated with category ratings and attributes. As shown, parental-control-policy database 122 may include category ratings 410, attributes 420, and parental controls 430. Category ratings 410 may include rated R movies, music with explicit lyrics, and music with suggestive lyrics. Category ratings 410 may be associated with parental controls 430 to provide parental-control policies. For example, a parent may create a policy indicating that access to rated R movies and music with explicit lyrics is prohibited. Thus, attempts to access rated R movies and music with explicit lyrics may be blocked. Additionally or alternatively, rated R movies and music with explicit lyrics may be automatically deleted from a child's computing device. A parent may also create a policy indicating that a child should be prompted to get approval from a parent before listing to music with suggestive lyrics.

Parental-control-policy database 122 may also associate attributes 420 with parental controls 430. For example, parental-control-policy database 122 may associate particular media files, artists, authors, and/or any other attribute of a media file with a parental control. As shown, a parent may allow access to files downloaded from ITUNES. As another example, a parent may establish a policy that causes a child to see a warning if the child attempts to access a compressed video file.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the intercepting, determining, identifying, applying, querying, accessing, using, sending, receiving, tracking, deleting, and preventing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as intercepting, determining, identifying, applying, querying, accessing, using, sending, receiving, tracking, deleting, and preventing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for intercepting, determining, identifying, applying, querying, accessing, using, sending, receiving, tracking, deleting, and preventing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the intercepting, determining, identifying, applying, querying, accessing, using, sending, receiving, tracking, deleting, and preventing steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the intercepting, determining, identifying, applying, querying, accessing, using, sending, receiving, tracking, deleting, and preventing steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Storage devices 532 and 533 may also be used, for example, to perform and/or be a means for performing, either alone or in combination with other elements, one or more of the identifying, intercepting, determining, identifying, applying, querying, accessing, using, sending, receiving, tracking, deleting, and preventing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the intercepting, determining, identifying, applying, querying, accessing, using, sending, receiving, tracking, deleting, and preventing steps disclosed herein. Network architecture 600 may also be used to perform and/or be a means for performing other steps and features set forth in the instant disclosure.

As detailed above, computing system 510 and/or one or more of components of network architecture 600 may perform and/or be a means of performing, either alone or in combination with other elements, one or more steps of the exemplary methods described and/or illustrated herein. For example, a computing system (e.g., computing system 510 and/or one or more of the components of network architecture 600) may perform a computer-implemented method for applying parental-control policies to media files. For example, the computing system may intercept a file-system call associated with a media file. The computing system may determine an attribute of the media file. The computing system may also identify a parental-control policy associated with the attribute of the media file. The computing system may further apply the parental-control policy to the media file.

In some embodiments, the computing system may intercept the file-system call associated with the media file by intercepting a file-system call to write the media file to a storage device. In other embodiments, the computing system may intercept the file-system call associated with the media file by intercepting a file-system call to read the media file. In at least one embodiment, the media file may comprise an audio file. In various embodiments, the computing system may determine the attribute of the media file by identifying a name of the audio file, a name of a song included in the audio file, a genre of the song, and/or an artist associated with the song.

In some embodiments, the computing system may determine the attribute of the media file by querying a remote public database to obtain the attribute of the audio file and/or by accessing metadata of the audio file. In at least one embodiment, the media file may comprise a video file. In other embodiments, the computing system may determine the attribute of the media file by identifying a signature included with the media file. In various embodiments, the computing system may identify the parental-control policy associated with the attribute of the media file by using the attribute to determine a category rating of the media file. The computing system may apply the parental-control policy to the media file by determining whether the category rating violates the parental-control policy.

In other embodiments, the category rating may include a sexual-content rating for the media file, a strong-language rating for the media file, and/or a violence rating for the media file. In some embodiments, the computing system may use the attribute to determine the category rating by sending the attribute to a category-ratings database and/or by receiving the category rating from the category-ratings database. In at least one embodiment, the computing system may track a child's attempts to access media files. In some embodiments, the computing system may apply the parental-control policy to the media file by deleting the media file and/or by preventing access to the media file.

In various embodiments, the computing system may include a parental-control-policy database that may include a parental-control policy. The computing system may include a category-ratings database. The category-ratings database may include a category rating associated with a media file. The computing system may include a file-system-monitor module in communication with the parental-control-policy database. The file-system-monitor module may identify the media file. The file-system-monitor module may also determine an attribute of the media file. The file-system-monitor module may further query the category-ratings database to identify the category rating associated with the media file. The computing system may include a policy-enforcement module in communication with the file-system-monitor module. The policy-enforcement module may query the parental-control-policy database to identify the parental-control policy associated with the category rating of the media file. The policy-enforcement module may also apply the parental-control policy to the media file. The computing system may include a processor configured to execute the file-system-monitor module and the policy-enforcement module.

In other embodiments, the computing system may include a policy-configuration interface. The policy-configuration interface may receive a request from a parent to associate the parent-control policy with the category rating. In at least one embodiment, the computing system may include an event log. The event log may track a child's attempts to access media files. In some embodiments, the policy-enforcement module may determine that the media file violates the parental-control policy by evaluating at least one category rating and at least one attribute of the media file. In various embodiments, the file-system-monitor module may determine the attribute of the media file by accessing metadata of the media file and by querying an attribute database. In at least one embodiment, the file-system-monitor module may include a file-system driver. The file-system driver may intercept a child's attempts to access media files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

One or more of steps described and/or illustrated herein may provide one or more transformations. For example, by intercepting a file-system call associated with a media file and applying a parental-control policy to the media file, a computing system may transform a child's access the media file (e.g., by preventing the child from accessing the media file).

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method comprising:
   intercepting, by a file-system driver, a file-system call associated with a media file, the file-system driver being configured to intercept file-system calls issued by multiple applications through which a child is capable of attempting to access the media file;
   determining, in response to the file-system driver intercepting the file-system call, whether the file-system call comprises an attempt to access a file that includes media content by checking whether a file extension of the media file identified by the file-system call matches a file extension included within a set of certain file extensions for at least one of e-book files, audio files, and video files;
   determining, in response to determining that the file extension of the media file identified by the file-system call matches a file extension included within the set of certain file extensions for at least one of e-book files, audio files, and video files, an attribute of the media file;
   identifying a parental-control policy associated with the attribute of the media file;
   applying the parental-control policy to the media file.

2. The computer-implemented method of claim 1, wherein intercepting the file-system call associated with the media file comprises at least one of:
   intercepting a file-system call to write the media file to a storage device;
   intercepting a file-system call to read the media file.

3. The computer-implemented method of claim 1, wherein the attribute of the media file comprises a hash of the media file.

4. The computer-implemented method of claim 1, wherein the media file comprises an audio file.

5. The computer-implemented method of claim 4, wherein determining the attribute of the media file comprises at least one of:
   identifying a genre of a song;
   identifying an artist associated with the song.

6. The computer-implemented method of claim 5, wherein determining the attribute of the media file comprises at least one of:
   querying a remote public database to obtain the attribute of the audio file;
   accessing metadata of the audio file.

7. The computer-implemented method of claim 1, wherein:
   the media file comprises a video file;
   applying the parental-control policy comprises:
      determining that the video file comprises a compressed video file;
      displaying a warning to the child that is attempting to access the compressed video file to inform the child that the video file is compressed.

8. The computer-implemented method of claim 1, wherein determining the attribute of the media file comprises identifying a signature included with the media file that indicates that the media file has been digitally signed by a content provider.

9. The computer-implemented method of claim 1, wherein:
   identifying the parental-control policy associated with the attribute of the media file comprises using the attribute to determine a category rating of the media file;
   applying the parental-control policy to the media file comprises determining whether the category rating violates the parental-control policy.

10. The computer-implemented method of claim 9, wherein the category rating comprises at least one of:
    a sexual-content rating for the media file;
    a strong-language rating for the media file;
    a violence rating for the media file.

11. The computer-implemented method of claim 9, wherein using the attribute to determine the category rating comprises:
    sending the attribute to a category-ratings database;
    receiving the category rating from the category-ratings database.

12. The computer-implemented method of claim 1, further comprising tracking the child's attempts to access media files.

13. The computer-implemented method of claim 1, wherein applying the parental-control policy to the media file comprises deleting the media file.

14. A system comprising:
    a file-system-monitor module, stored in a memory, that comprises a file-system driver configured to intercept file-system calls issued by multiple applications through which a child is capable of attempting to access a media file, the file-system-monitor module programmed to:
       intercept, through the file-system driver, a file-system call associated with the media file;

determine, in response to the file-system driver intercepting the file-system call, whether the file-system call comprises an attempt to access a file that includes media content by checking whether the media file extension of the media file identified by the file-system call matches a file extension included within a set of certain file extensions for at least one of e-book files, audio files, and video files;

determine, in response to determining that the file extension of the media file identified by the file-system call matches a file extension included within the set of certain file extensions for at least one of e-book files, audio files, and video files, an attribute of the media file;

identify a parental-control policy associated with the attribute of the media file;

a policy-enforcement module, stored in the memory, that is in communication with the file-system-monitor module and that is programmed to apply the parental-control policy to the media file;

one or more hardware processors configured to execute the file-system-monitor module and the policy-enforcement module.

15. The system of claim 14, wherein the file-system driver is programmed to intercept the file-system call associated with the media file at least in part by one of:

intercepting a file-system call to write the media file to a storage device;

intercepting a file-system call to read the media file.

16. The system of claim 14, wherein the attribute of the media file comprises a hash of the media file.

17. The system of claim 14, wherein the policy-enforcement module is programmed to determine whether the media file violates the parental-control policy by evaluating the attribute of the media file and at least one category rating of the media file.

18. The system of claim 14, wherein the file-system-monitor module is programmed to determine the attribute of the media file at least in part by identifying a signature included with the media file that indicates that the media file has been digitally signed by a content provider.

19. The system of claim 14, wherein:

the media file comprises an audio file;

the file-system-monitor module is programmed to determine the attribute of the media file by performing at least one of:

identifying a genre of a song;

identifying an artist associated with the song.

20. A non-transitory computer-readable medium comprising one or more computer-executable instructions that, when executed by a computing device, cause the computing device to:

intercept, through a file-system driver, a file-system call associated with a media file, the file-system driver being configured to intercept file-system calls issued by multiple applications through which a child is capable of attempting to access the media file;

determine, in response to the file-system driver intercepting the file-system call, whether the file-system call comprises an attempt to access a file that contains media content by checking whether a file extension of the media file identified by the file-system call matches a file extension included within a set of certain file extensions for at least one of e-book files, audio files, and video files;

determine, in response to determining that the file extension of the media file identified by the file-system call matches a file extension included within the set of certain file extensions for at least one of e-book files, audio files, and video files, an attribute of the media file;

identify a parental-control policy associated with the attribute of the media file;

apply the parental-control policy to the media file.

\* \* \* \* \*